United States Patent [19]

Meyers et al.

[11] Patent Number: 4,627,921
[45] Date of Patent: Dec. 9, 1986

[54] TREATMENT OF WATER TO LOWER THE OXYGEN AND THE TOTAL ORGANIC CARBON WITHIN THE SAME

[75] Inventors: Peter S. Meyers, West Covina; Gerald Alexander, La Canada, both of Calif.

[73] Assignee: L A Water Treatment Corporation, City of Industry, Calif.

[21] Appl. No.: 728,289

[22] Filed: Apr. 29, 1985

[51] Int. Cl.⁴ .............................................. C02F 9/00
[52] U.S. Cl. .................................... 210/668; 210/669
[58] Field of Search ........................ 210/668, 669, 757

[56] References Cited
U.S. PATENT DOCUMENTS
4,556,492  12/1985  Dickerson et al. ................ 210/668

OTHER PUBLICATIONS

"Hydrazine and Water Treatment", account of the proceedings of the International Conference held at Bournemouth, May 15–17, 1957, Whiffen and Sons, London, pp. 8 and 54–58.

Primary Examiner—Ivars Cintins
Attorney, Agent, or Firm—Edward D. O'Brian

[57] ABSTRACT

The total organic carbon and oxygen in water may be reduced by adjusting the pH of the water to within the range of from about 4 to about 6.9 and then adding an excess of a reducing agent over the amount necessary to react with all of the organic carbon and oxygen present in the water. Preferably the water containing the reducing agent is passed over an adsorbent, absorbent activated carbon bed within a treatment unit the interior of which is anaerobic.

3 Claims, 1 Drawing Figure

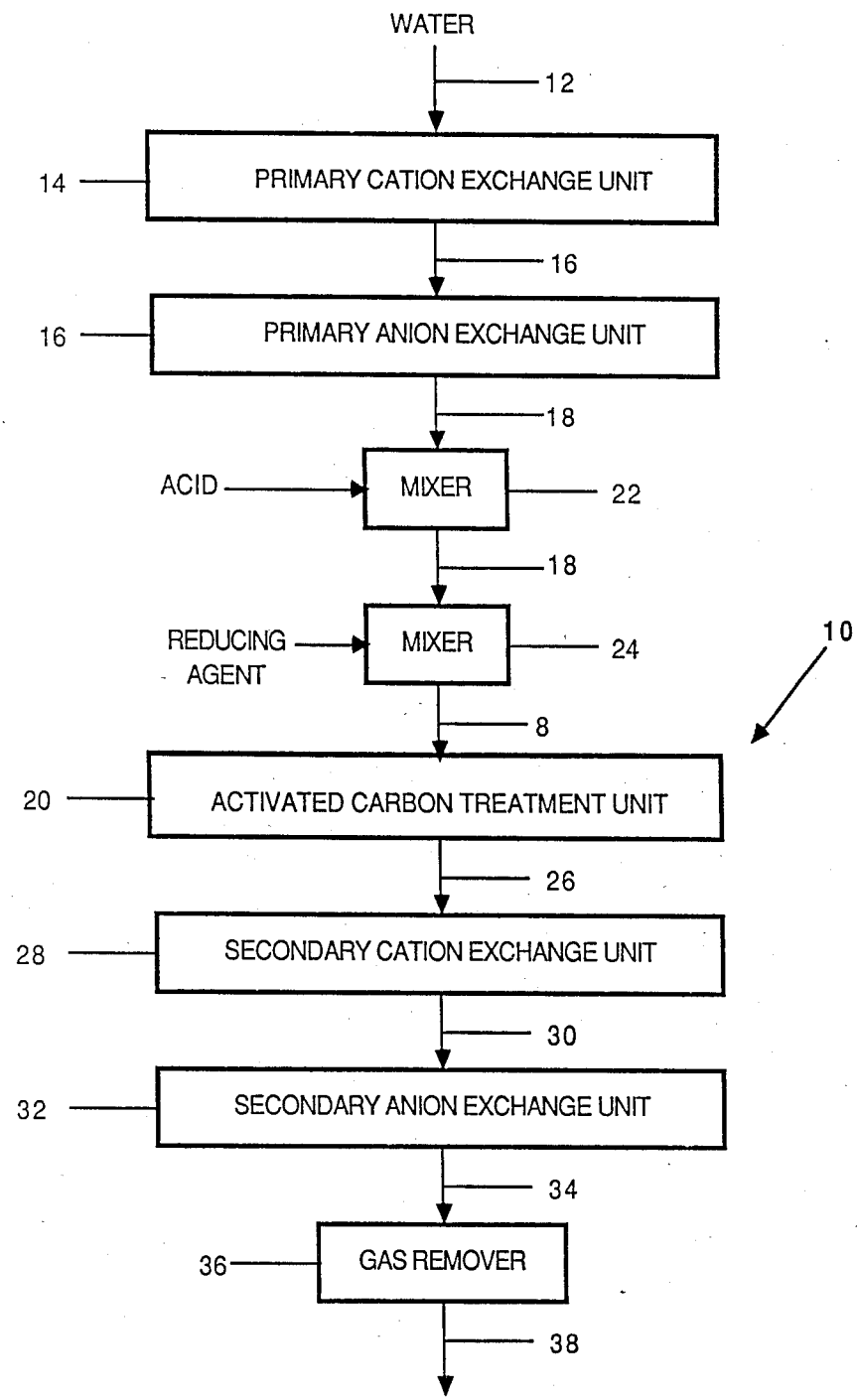

TREATMENT OF WATER TO LOWER THE OXYGEN AND THE TOTAL ORGANIC CARBON WITHIN THE SAME

The invention set forth in this specification pertains to a new and improved method of treating water so as to substantially lower the oxygen content of the water and so as to substantially lower the total organic carbon within the water.

For reasons which are unimportant to an understanding of the present invention it is normally desired to lower both the oxygen content and the total organic carbon content of water to as great an extent as reasonably possible when the water is to be utilized in various "critical" applications such as, for example, in boilers and various technologically advanced facilities. The water used in such boilers is, of course, also treated so as to remove anions and cations in the water.

In the past a wide variety of different processes have been recognized as having utility or potential utility in removing various anions and cations found in the water and in removing the oxygen and total organic carbon content from water. It is considered that it is generally recognized that it is most economic to remove the latter utilizing known types of anion and cation exchange beds. However, it is not considered that there has been any general agreement as to the most economic and desirable way of lowering the oxygen and total organic carbon content of water to a level which is acceptable in many facilities where the levels of these materials is quite critical.

In the past it has been recognized that both dissolved oxygen and total organic carbon are, at least in theory, capable of being removed from water by treating the water with hydrazine so as to cause appropriate chemical reactions oxidizing the organic carbon and so as to react the oxygen. These past attempts to accomplish an effective removal of total organic carbon and oxygen with hydrazine have been largely ignored.

The reasons for this are not known. However, it seems quite probable that these reasons relate to the relative reactivity of the hydrazine. It is recognized that the reaction of this compound with oxygen and organic carbon in water is relatively slow except at comparatively high temperatures or in the presence of various inorganic catalysts. For treatment with hydrazine or any other similar reducing agent to be acceptable for use in reducing the oxygen and total organic carbon content of water the reactions involved preferably should be of such character that they will proceed at satisfactory rates at normal ambient or somewhat lower temperatures in order to minimize the treatment costs.

BRIEF SUMMARY OF THE INVENTION

Broadly the present invention is intended to provide a new and improved method of treating water so as to remove from it a significant amount of total organic carbon and oxygen which is sufficient for such water to be acceptable in many "critical" uses. More specifically, the invention is intended to provide a treatment method as indicated in the preceding sentence which is primarily directed to the use of hydrazine or a similar reducing agent to reduce total organic carbon and oxygen values to an acceptable level and which is of such a character that it may be economically and easily carried out at a normal ambient temperature at a comparatively rapid rate. The latter is important in reducing the dwell time of water within an appropriate apparatus.

In accordance with this invention these various objectives are achieved by providing a process of treating water to lower the total organic carbon and oxygen content of the water which comprises the steps of: adjusting the acidity of the water being treated to a pH of from about 4 to about 6.9 by the addition of a mineral acid to said water; adding a reducing agent capable of reacting with the total organic carbon and oxygen in said water so as to reduce the levels of both of them in an excess of an amount necessary to react with all of the oxygen and total organic carbon in said water and allowing contact between the water and the reducing agent for a time period and at a temperature in order to achieve such reduction; and passing water mixed with the reducing agent through an adsorbent, absorbent bed within a housing while maintaining the interior of said housing anaerobic.

BRIEF DESCRIPTION OF THE DRAWING

Because of the nature of this invention it is best more fully explained with reference to the accompanying drawing in which:

the FIGURE is a diagrammatic flow sheet indicating a presently preferred mode or manner of practicing the present invention.

Because of the nature of this invention and the fact it involves the operative concepts or principles set forth in the appended claims the accompanying drawing is not to be taken as limiting or restricting the invention in any manner. It is believed that it will be apparent to those skilled in the art of water treatment that the concepts or principles of the invention as claimed can be utilized in other manners than as specifically indicated in the complete FIGURE of the drawing. Thus, the principles or concepts need not be utilized with the precise sequence or series of ion exchange units illustrated.

DETAILED DESCRIPTION

In the drawing there is shown a complete treatment system 10 in which water to be processed so that it is suitable for use in various critical applications such as in certain types of boilers is conveyed through feed line 12 to a primary cation exchange unit 14. From this unit the water is conveyed by a pipe 16 to a primary anion exchange unit 16. A pipe 18 is then used to convey the water from the exchange unit 16 to a known type of activated carbon water treatment unit 20. This unit includes an enclosed housing (not separately numbered).

As water is conveyed to the unit 20 through the pipe 18 a mineral acid is introduced into the water through an appropriate known or conventional mixer device 22 for adding such an acid. Further, after such an acid has been added by the device 22 and mixed with the water as, for example, by normal fluid motion within the pipe 18 another device 24 corresponding to the device 22 is used to introduce a reducing agent into the water. This reducing agent should be thoroughly mixed with the water so as to have the opportunity to react with the dissolved oxygen and any organic carbon present within the water. This is normally accomplished by turbulent flow in the pipe 18.

This reaction will continue as the water is conveyed into the activated carbon water treatment unit 20. In this treatment unit the water will be contacted with activated carbon—a highly absorbent, adsorbent material. Preferably an amount of the reducing agent will be used such that when it is admixed with the water and introduced into the treatment unit 20 the interior of this treatment unit 20 will remain anaerobic at all times.

The water passing through the treatment unit 20 will be conveyed by a further pipe 26 to a known or conventional secondary cation exchanger 28. It will be conveyed from it by a further pipe 30 to a secondary anion exchanger 32. From there the water may be conveyed by a further pipe 34 to a conventional gas remover 36 prior to being sent to a still further pipe 38 to where it is utilized.

The invention primarily concerns the treatment of water within the pipe 18 and the treatment unit 20. In accordance with this invention any mineral acid may be utilized to adjust the pH of the water to a pH at which the reducing agent used will react comparatively rapidly at a normal ambient temperature with oxygen and organic carbon. Normally a pH of from about 4 to about 6.9 will be necessary. If the pH is outside of this broad range the desired reactions do not occur to any significant extent. It is considered preferable to use an amount of acid necessary to adjust the pH to within the range from about 5 to about 6 in order to promote these reactions to as great an extent as reasonably possible. In practice a pH of about 5.5 is currently used in carrying out the invention. The mineral acid used should be an acid which disassociates into ions which can be readily removed by ion exchange beds.

The reducing agent used should be a reducing agent which is effective for the intended purpose. It is considered possible within the broad concepts of the invention to use a reducing agent selected from the group consisting of hydrazine, morpholine, sodium sulfite or sodium acid sulfite. Because of its effectiveness as well as its comparatively reasonable cost it is considered preferable to utilize hydrazine. This and the other reducing agents named have been selected because of their reactivities and because they do not yield reaction products with oxygen and organic carbon which create significant removal problems.

The amount of the reducing agent used can preferably be determined with reference to the amount of oxygen and organic carbon present in the water treated. At least an amount sufficient to react with all of the latter two items so as to remove them from the water should be used. This may be referred to as the stoichiometric amount. Preferably an amount of a reducing agent equal to from about 110% to about 130% of the stoichiometric amount is used so as to make sure that the desired reactions go to completion. It is considered uneconomic to use a greater amount than this of the reducing agent.

An amount of reducing agent within this range will be adequate to maintain the interior of the treatment unit 20 anaerobic. This is quite important in preventing undesired contamination by oxygen. It is considered somewhat surprising that with the present invention there are no indications that any of the activated carbon—the preferred adsorbent, absorbent material for use in the treatment unit 20—will pass into solution. Apparently some of the reducing agent used will be held on this adsorbent, absorbent material and will be continuously contacted by water passing though the unit 20. Apparently the absorbent material serving to hold the reducing agent in this manner is effective to reduce organic carbon and oxygen to an acceptable level without any particular amount of time being required to accomplish this objective.

The present invention is considered to be quite important from a commercial standpoint. With a sytem corresponding to the system 10 it has been found possible to consistently reduce the total organic carbon to 100 parts per billion or less and to consistently reduce the total dissolved oxygen to 50 parts per billion or less in water. These levels are considered to be quite acceptable in many "critical" applications.

We claim:
1. A process of treating water to lower the total organic carbon and oxygen content of the water which comprises the steps of:
   adjusting the acidity of the water being treated to a pH of from about 4 to about 6.9 by the addition of a mineral acid to said water;
   adding a reducing agent selected from the group consisting of hydrazine, morpholine, sodium sulfite and sodium acid sulfite capable of reacting with the total organic carbon and oxygen in said water so as to reduce the levels of both of them in excess of an amount necessary to react with all of the oxygen and total organic carbon in said water and allowing contact between the water and the reducing agent for a time period and at a temperature in order to achieve such reduction; and
   passing water mixed with the reducing agent through an absorbent, adsorbent bed within a housing while maintaining the interior of said housing anaerobic.
2. A process as claimed in claim 1 wherein:
said reducing agent is hydrazine.
3. A process as claimed in claim 2 wherein:
an amount of said reducing agent is used which is within the range of from about 110 to about 130% of the stoichiometric amount of the reducing agent necessary to react to all organic carbon and oxygen in said water.

* * * * *